350-168 CROSS REFERENCE SEARCH ROOM

June 25, 1968 A. W. LOHMANN 3,390,257

OPTICAL COMPUTER FOR CORRELATION AND CONVOLUTION

Filed April 13, 1964 2 Sheets-Sheet 1

INVENTOR.
ADOLF W. LOHMANN
BY Elmer Galbraith
ATTORNEY

OPTICAL COMPUTER FOR CORRELATION AND CONVOLUTION

Filed April 13, 1964 2 Sheets-Sheet 2

United States Patent Office 3,390,257

Patented June 25, 1968

3,390,257

OPTICAL COMPUTER FOR CORRELATION AND CONVOLUTION

Adolf W. Lohmann, San Jose, Calif., assignor to International Business Machines Corporation, New York, N.Y., a corporation of New York Filed Apr. 13, 1964, Ser. No. 359,325
11 Claims. (Cl. 235—181)

ABSTRACT OF THE DISCLOSURE

An apparatus for generating the correlation or convolution of two transparencies: a first spectroscope is used to produce a continuum of images of a first transparency on the face of a second transparency. All of the light passing through the second transparency is collected into one point. The collected light repersents the convolution or correlation of the images on the first and second transparencies. The information bearing variable is the wavelength of the light. A second spectroscope is used to transform the wavelength variable to a space variable.

This invention relates to computing systems and more particularly to computing systems wherein information is transmitted by and operations are performed upon light signals.

Correlation and convolution are very important mathematical operations that are used for such diverse purposes as character recognition, testing photographic materials, evaluation of photographs, and the evaluation of meteorological recordings. In order to perform the mathematical operations of correlation or convolution with a a general purpose digital computer, an extremely large number of operations within the computer are required.

There are known devices which optically correlate a plurality of functions; however, each of the known devices has severe limitations. For example, an article in the Review of Scientific Instruments, volume 28, No. 10, entitled "Optical Auto-Correlation Measurement of Two Dimensional Random Patterns" describes a device which uses a schlieren type of lens system to perform correlation. The disadvantage of the device described in the above article is that its accuracy is limited to within the range of geometrical objects. Other known types of optical correlation devices only correlate specific points in a function rather than correlating the entire function.

The device of the present invention overcomes the disadvantages inherent in the devices shown in the prior art. That is, the device of the present invention is accurate beyond the range of geometric optics and it can correlate entire functions.

An object of the present invention is to provide an improved device for performing correlation.

Another object of the present invention is to provide a device which can correlate two entire functions.

Still another object of the present invention is to provide a device which can generate the convolution of two entire functions.

Still another object of the present invention is to provide a highly accurate device for performing the mathematical operations of correlation and convolution.

Yet another object of the present invention is to provide an optical device for generating correlation and convolution integral wherein diffraction effects are minimized.

Still another object of the present invention is to provide a highly accurate device for generating auto-correlation functions.

Still another object of the present invention is to provide a highly accurate device for generating auto-convolution of functions.

The present invention includes a polychromatic light source and spectroscopic means which separates light according to the wave lengths thereof. The spectroscopic means is used to product a continuum of shifted images, each image being generated by light of a different frequency. These images are focused on an object. The light which passes through the object represents the correlation or the convolution of the function which defines the shifted images and the function which defines the transparency of the object. The variable in the correlation or the convolution function at the output of the first spectroscopic means is wave length. By directing the light which passes through the object through a second spectroscopic means, the different wave lengths are transformed into different positions and hence an image is created wherein the correlation or convolution function is displayed with distance as the variable.

The foregoing and other objects, features and advantages of the invention will be apparent from the following more particular description of preferred embodiments of the invention, as illustrated in the accompanying drawings.

Figure 1:
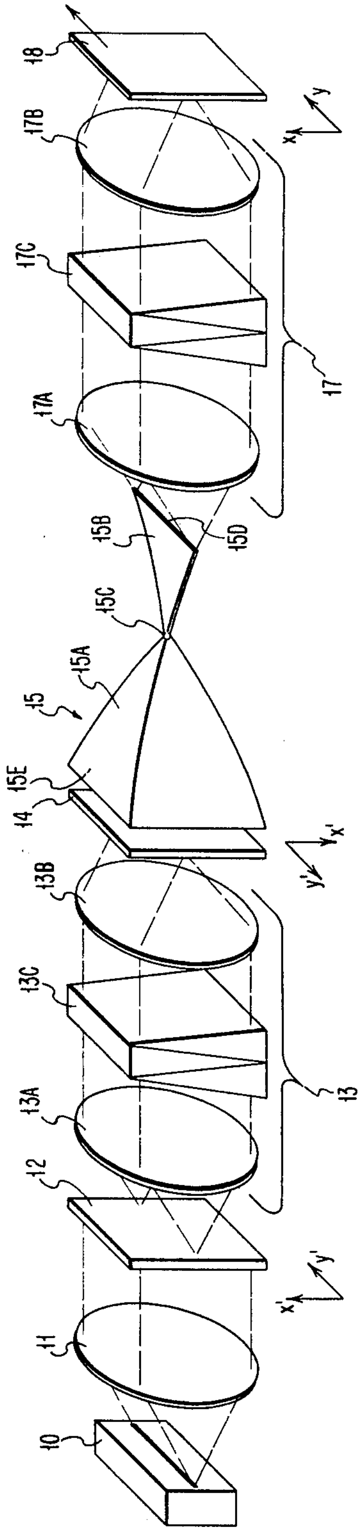
FIGURE 1 shows the first preferred embodiment of the present invention.

The device shown in FIGURE 1 generates an image which represents the correlation or the convolution integral of the transparency of a first object 12 with the transparency of a second object 14. The image which represents the correlation or the convolution integral appears on a screen 18.

The transparency of objects 12 and 14 is a function of the $x'$ and $y'$ coordinates. For reasons which will be explained later, the direction of the $x'$ and $y'$ coordinate axes in the plane of object 14 is 180 degrees different than the direction of the $x'$ and $y'$ coordinate axes in the plane of object 12. It is noted that the orientation of the reference axes is a mathematical convenience which is not related to the physical structure of the applicant's device. The direction of the coordinate axes in each plane is shown in the figure. The zero origin of the $x'$ and $y'$ coordinates is taken as the lower left hand corner of the object 12 and the upper right hand corner of object 14. Specifically, the transparency of object 12 (designated T–12) and the transparency of object 14 (designated T–14) is defined by the following relationship:

(1) $$\text{T–12}=3x'+y'$$

(hereinafter referred to as function T–12).

(2) $$\text{T–14}=x'+2y'$$

(hereinafter referred to as function T–14).

The limits on $x'$ and $y'$ are $$0<x'<a$$
$$0<y'<b$$

Where $a$ and $b$ respectively represent the width and the height of both transparencies.

The output which appears at screen 18 represents the correlation integral of functions T–12 and T–14. The coordinates in the plane of screen 18 are designated the $x$ and $y$ coordinates. The correlation integral of functions T–12 and T–14 can be expressed as:

(3) $$\phi(x)=\int\int(x'+2y')[3(x+x')+(c+y')]dx'dy'$$

The limits on the integration are $$x'\rightarrow 0 \text{ to } x\text{–}a$$
$$y'\rightarrow 0 \text{ to } b$$
$$c=0$$

The limits on the integration are established by the width and height of transparencies 12 and 14. The constant term $c$ is equal to zero due to the particular origins chosen for the coordinate systems which define the transparency of objects 12 and 14.

The above integration yields the following result (4)

$$\phi(x)=a^3b+\frac{1}{4}a^2b^2+\frac{2}{3}ab^3\frac{3}{2}b^2$$
$$+\frac{5}{2}ab^2x-\frac{3}{2}a^2bx-\frac{3}{2}b^2x-\frac{1}{4}lx^2b^2+\frac{1}{2}bx^3$$

Equation 4 above defines the output which appears on screen 18. It is noted that the output is only a function of $x$, that is, there is no variation in the $y$ direction in the image which appears on screen 18. However, the image on screen 18 is a two dimensional image which covers the entire screen.

The above discussion shows how the image on screen 18 can be interpreted as the correlation integral of the functions which define the transparency of objects 12 and 14. The image on screen 18 can also be interpreted as the convolution integral of the functions which define the transparency of objects 12 and 14. The transparency of object 14 can be defined by function T–14* below instead of function T–14 above. With functions T–14* the transparency of a point is obtained by substituting the negative of the coordinates of the point in the function. Functions T–14 and T–14* can be termed anti-symmetrical functions.

(5) $$T\text{–}14^*=-x'-2y'$$

The convolution of functions T–12 and T–14* can be expressed as follows:

(6) $$\psi(-x,)=\int\int(-x'-2y')[3(x+x')+(c+y')]dx'dy'$$

or letting $x''=x+x'$ and $y''=y+y'$ (7) $$\psi(-x,)=\int\int[(x-x'')+2(y-y'')][3x''+y'']dx''dy''$$

$$x''\rightarrow x \text{ to } a$$
$$y'\rightarrow 0 \text{ to } b$$
$$c=0$$

The limits are determined by the size of objects 12 and 14. Performing the above integration yields the results of:

(8) $$\psi(x,)=a^3b+\frac{1}{4}a^2b^2+\frac{2}{3}ab^3+\frac{3}{2}b^2$$
$$+\frac{5}{2}ab^2x-\frac{3}{2}a^2bx-\frac{3}{2}b^2x-\frac{1}{4}lx^2b^2+\frac{1}{2}bx^3$$

Clearly, the function 8 equals the function 4, hence the image on screen 18 also represents the convolution between functions T–12 and T–14* which represents the transparency of objects 12 and 14.

As shown in FIGURE 1, the first preferred embodiment of the present invention includes light source 10 which emits white light, a collimating lens 11, a first object 12, a spectroscope 13, a second object 14, a light collecting device 15, a second spectroscope 17, and a screen 18.

The system shown in FIGURE 1 operates as follows: Light source 10 and lens 11 produce collimated light which is directed at object 12. The light which passes through object 12 goes into spectroscope 13. Spectroscope 13 includes two lenses, 13A and 13B and a prism 13C. Lenses 13A and 13B create an inverted image of object 12 on the surface of object 14. The fact that lenses 13A and 13B rotate the image of object 12 is the reason that the reference direction of coordinates $x'$ and $y'$ is different in the plane of object 12 than in the plane of object 14. Prism 13C deviates the light passing therethrough by an amount dependent upon the frequency of the light. Since light source 10 is polychromatic, a continuum of images of object 12 are produced on the surface of object 14.

The operation of spectroscope 13 can best be understood by considering what would happen if light source 10 merely generated light having only two different frequencies. In this case, the light passing through object 12 would be divided into two parts by spectroscope 13 and two slightly shifted images of object 12 would be produced on the face of object 14. If light source 10 emitted light having five frequency components, spectroscope 15 would produce five images of object 12 on the face of object 14, each of the five images being positioned differently. In the embodiment shown in FIGURE 1, light source 10 emits white light which has a continuous spectrum of frequency components; hence, spectroscope 13 produces a continuum of images of object 12 on the face of object 14.

The light which passes through object 14 consists of a plurality of images of object 12 superimposed on object 14. In fact, since source 10 emits white light, there are a continuum of images of object 12 superimposed on object 14. The light which passes through object 14 can be described by the expression:

(9) $$[3(k\lambda+x')+y'][x'+2y']$$

Where:

$3x'+y'$ is the function which represents the transparency of object 12;

$3(k\lambda+x')+y'$ represents an image of object 12 shifted by an amount $k\lambda$;

$x'+2y'$ is the function which describes the transparency of object 14;

$\lambda$ is the wave length of light emitted by source 10, and since source 10 emits a continuous spectrum $\lambda$ is a continuous variable;

$k$ is a constant which is determined by the amount of shift introduced by prism 13C.

Light collecting device 15 has two parts, the first is designated 15A and the second is designated 15B. Part 15A is rotationally symmetrical and it collects all of the light passing through object 14 into a small area 15C. Area 15C approximates a point source of light. Part 15B divides the light passing through area 15C into a narrow strip of light.

Part 15A of device 15 essentially integrates Expression 8 above over the $x'$ and $y'$ coordinates as shown below:

(10) $$\int\int(x'+2y')[3(k\lambda+x')+(c+y')]dx'dy'$$

The limits on the integration are established by the length and width of object 14 as previously explained. The light passing through area 15C represents the convolution or the correlation integral of the functions which define the transparency of objects 12 and 14. The correlation or convolution integral is represented by the light passing through area 15C with wave length as a variable.

Although the light passing through area 15C represents the correlation or the convolution integral of the functions which define the transparency of objects 12 and 14, the correlation and the convolution integral of these functions as represented by the light in area 15C is not particularly useful in itself since the variable is wave length.

Spectroscope 17 changes the function of wave length which appears at area 15C into a function of distance or of position. Spectroscope 17 includes two lenses 17A and 17B and a prism 17C. Lenses 17A and 17B generate an image of source 15D on screen 18. Prism 15C deviates each frequency of light by a different amount. Thus, whereas the variable at the output of device 15 is frequency, the variable at the output of spectroscope 17 is position.

Portion 15B of device 15 is not essential. Without portion 15B of device 15, the images on screen 18 would be images of the relatively small area 15C. With portion 15B, the images on screen 18 are relatively large since they are images of area 15D. Naturally, if portion 15B is not used lenses 17A and 17B would have to be positioned so as to image area 15C on screen 18.

Light collecting device 15 may be fabricated from glass or any other material which has a suitable index of refraction so that light entering device 15 from 15E (the end facing object 14) is directed to area 15C by internal reflections. Device 15 can be coated with silver on all sides except the ends 15D and 15E to reduce light loss. If device 15 is coated with silver it can be made shorter. The length of device 15 is determined by the maximum allowable angle for the sides which will still insure total internal reflection.

Device 15 could be replaced by a series of lenses which would collect and then spread the light in the same manner as device 15. A series of lenses would have the advantage that they would produce a minimum amount of attenuation.

The two-dimensional image displayed on screen 18 represents the correlation or the convolution integral in one dimension only. The reason for this is that spectroscopes 13 and 17 deviate the light in only one particular dimension. A correlation in two dimensions can be obtained by moving object 12 and screen 18 in the $y$ direction (both object 12 and screen 18 moving in same direction at the same speed) and by providing a time integrating device at screen 18. An integrating device can be provided at screen 18 by coating screen 18 with a retentive phosphor which has a relatively long persistence.

The embodiments shown in FIGURE 1 relate to the generation of the correlation and convolution integral of the transparency of two particular objects, 12 and 14. Naturally, it should be understood that the correlation or convolution integral of any two functions can be generated by the system shown in FIGURE 1 by merely replacing objects 12 and 14 with objects which have the required transparency. The general case can be explained by defining the transparency of object 12 as $g(x', y')$, and the transparency of object 14 as $f(x', y')$. In this case, the image which appears on screen 18 represents the correlation integral of the two functions $g(x', y')$ and $f(x', y')$. Stated mathematically, the image which appears on screen 18 can be defined as $$(11)\quad \phi(x)=\iint[f(x', y')][g(x+x', c+y')]dx'dy'$$

As explained above, with respect to a specific example, the image on screen 18 also represents the convolution integral of two functions. Specifically, the image on screen 18 represents the convolution integral of $$(12)\quad g(x', y') \text{ and } f^*(-x', -y')$$

Where:

$$f^*(-x', -y')=f(x', y')$$

That is, the image on screen 18 represents the following convolution integral:

$$(13)\quad \psi(-x)=\iint[f^*(-x', -y')][g(x+x', c+y')]dx'dy'$$

This integral can be written in a form which is more familiar as a convolution integral by letting $$(14)\quad x''=x+x'$$

$$(15)\quad y''=c+y'$$

Substituting Equations 14 and 15 in Equation 13 yields $$(16)\quad \psi(-x)=\iint[g(x'', y'')][f^*(x-x'', c-y'')]dx''dy''$$

The terms auto-correlation and auto-convolution are used to indicate respectively the correlation of a function with itself and the convolution of a function with itself. The system shown in FIGURE 1 can be used to generate an image which represents the auto-correlation integral of a function or the auto-convolution integral of a function by using two identical objects 12 and 14.

Figure 2:
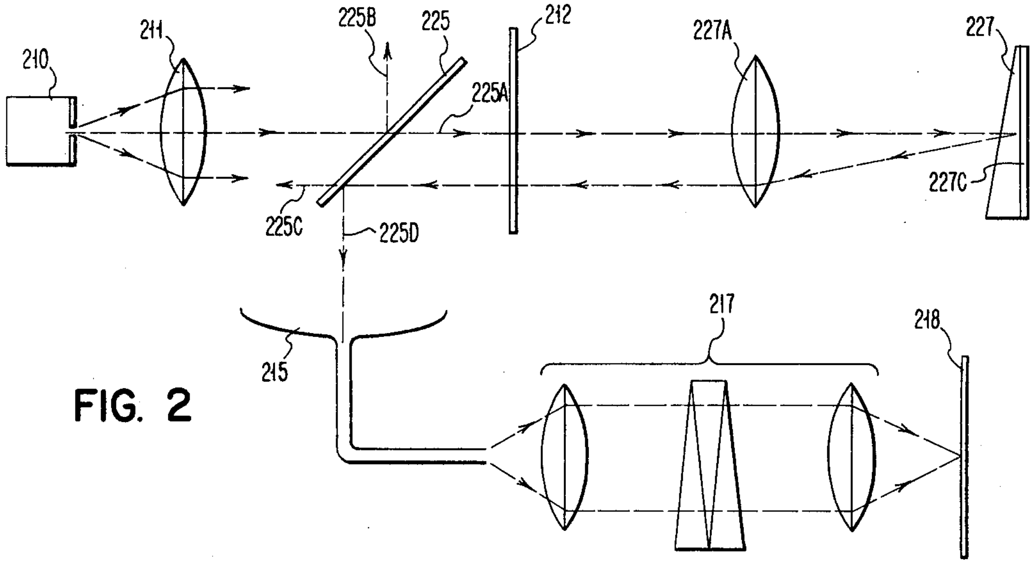
FIGURE 2 shows the second preferred embodiment of the present invention.

The second preferred embodiment shown in FIGURE 2 generates an image which represents the auto-convolution integral of a function merely using one object. In the first embodiment, images of object 12 were projected onto object 14. In the second embodiment, images of an object 112 are projected onto object 112 itself. The images are oriented in a direction which is one hundred and eighty degrees different than the orientation of the object itself; hence, the subsequent integration produces an auto-convolution integral.

The second embodiment includes a light source 210, a collimating lens 211, a beam splitter 225, an object 212, a lens 227A, a littrow spectroprism 227, a light collecting means 215, a spectroscope 217, and a screen 218. The image which appears on screen 218 represents the auto-convolution of the transparency of object 212.

The principle of operation of the second embodiment is substantially identical to the principle of operation of the first embodiment with the exception that after the light passes through object 212 and is divided into a spectrum by spectroprism 227, a reflective coating 227C on spectroprism 227 reflects the light back through object 212 to the second spectrometer 217. In order to show the correspondence between the first embodiment and the second embodiment, the last two digits of the numerals used to identify parts in the second embodiment are the same as the numerals used to identify the corresponding parts in the first embodiment. For example, light source 210 in the second embodiment corresponds to light source 10 in the first embodiment.

The second embodiment operates as follows: Source 210 emits white light, which is collimated by lens 211. Beam splitter 225 divides the light from source 210 into two beams 225A and 225B. The light in beam 225B is lost. The light in beam 225A passes through object 212. Spectroprism 227 has a silvered surface 227C on the back surface thereof. Silvered surface 227A together with lens 227A forms an image of object 212 on the back face of object 212. Lens 226, together with silvered surface 227C, performs substantially the same function as lenses 13A and 13C in FIGURE 1. Prism 227 deviates the light by an amount which is dependent on wave length similar to spectroscope 13. After passing through object 212 the second time, the light is again divided into two beams, 225C and 225D by beam splitter 225. Light in beam 225C is lost and light in beam 225D passes into light collecting device 215. The operation of spectroscope 217 is identical to the operation of spectroscope 17 in the system shown in FIGURE 1; hence, no further explanation thereof is given.

The lens 227A and silvered surface 227C effect an inversion of the images of object 212. Hence, images which are projected back on object 212 are oriented one hundred and eighty degrees differently than object 212. This is the reason that the image that appears on screen 218 represents the convolution of the transparency of object 212.

Figure 3:
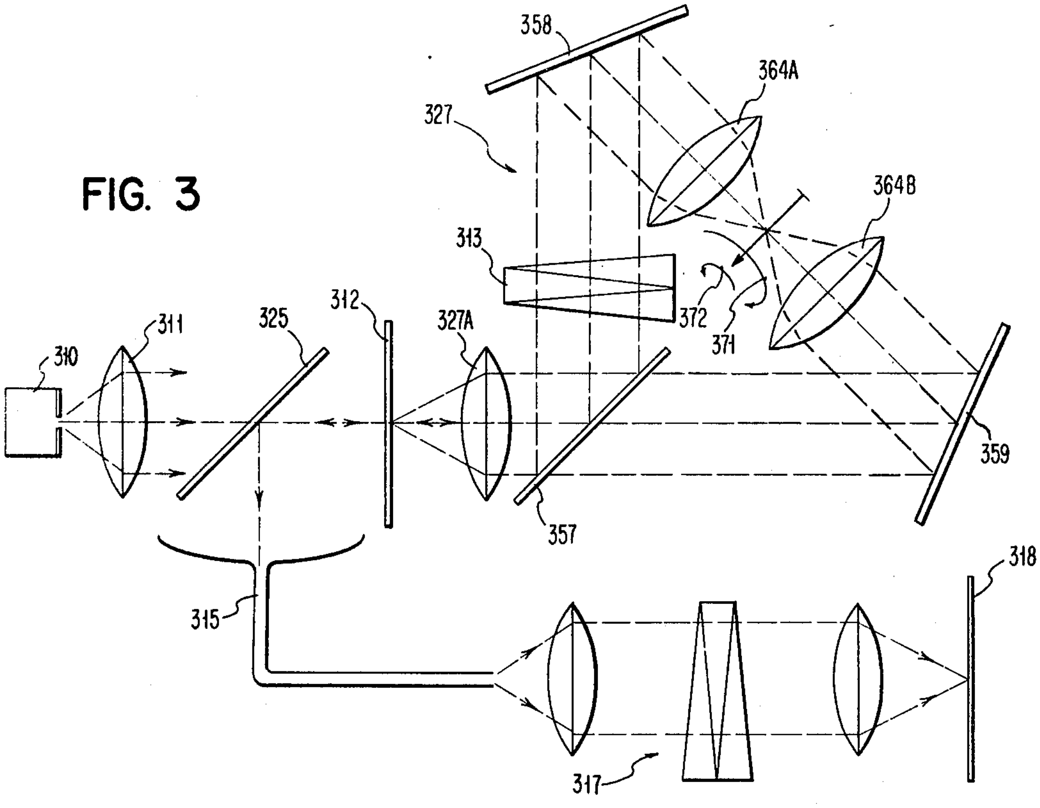
FIGURE 3 shows a third preferred embodiment of the present invention.

A third preferred embodiment of the invention is shown in FIGURE 3. The third embodiment merely includes one object 313 similar to the second embodiment; however, the third embodiment generates an image on screen 318 which represents the auto-correlation integral of the function which describes object 312. This is in contrast to the system shown in FIGURE 2 which generated the auto-convolution integral of the function which described object 212.

The third embodiment includes a light source 310, a collimating lens 311, a beam splitter 325, the object 312, lens 327A, a reflecting spectroscope 327, a light collector 315, a spectroscope 317, and a screen 318. A number scheme similar to that used with the second embodiment is employed in the assignment of numbers to the various components which form part of the third embodiment.

One major difference between the second and the third embodiments is that the reflecting spectroscope 227 shown in FIGURE 2 inverts the image which comes from object 212. Reflecting spectroscope 327 does not invert the image which it receives from object 312. Thus, the image which appears on screen 318 represents the auto-correlation integral of the function which describes the transparency of object 312 rather than the auto-convolution integral as in the case of the system shown in FIGURE 2. The only difference between the second and third embodiment is with respect to reflecting spectrometer 327; hence, this is the only component of the third embodiment which will be described further.

Reflecting spectrometer 327 includes spectroprism 313, beam splitter 357, mirrors 358 and 359 and a lens system 364 which includes lenses 364A and 364B.

The light which passes through lens 327A is divided into two segments by beam splitter 357. The two parts of the light travel around the triangle formed by beam splitter 357 and mirrors 358 and 359 in opposite directions as indicated by arrows 371 and 372. The light which travels in the direction of arrow 372 experiences an inversion at mirror 359, an inversion due to lens system 364, an inversion due to mirror 358, and an inversion due to the reflection at beam splitter 357. The light which travels along path 371 also experiences four inversions. Thus, the images which are projected on the face of object 312 are oriented in the same direction as object 312. For this reason, the images generated at screen 318 represent the auto-correlation function rather than the auto-convolution function as with the embodiment shown in FIGURE 2.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An optical device comprising:
a first object, the transparency of which is described by a first function having a first set of reference axes;
means for directing polychromatic light through said first object;
a second object, the transparency of which is described by a second function, said second function having a set of reference axes opposite in direction to said first set;
first spectroscopic means for dividing light passing through said first object into a continuum of physically separated images and for projecting said images onto said second object; and
means for collecting the light passing through said second object into substantially a point source,
second spectroscopic means for dividing the light from said point source in accordance with the frequency of said light,
whereby a representation of the correlation integral of said first function and said second function is obtained.

2. An optical device comprising:
a first object, the transparency of which is described by a function $f(x, y)$, said function having a set of reference axes $x$, and $y$;
means for directing polychromatic light through said first object;
spectroscopic means for dividing light passing through said first object into a continuum of physically separated images;
a second object, the transparency of which is described by two antisymmetrical functions, $g(x, y)$ and $g^*(-x, -y)$, where $x$ and $y$ refer to said reference axes, said second object positioned to receive the light which passes through said spectroscopic means; and
means for collecting the light passing through said second object into an area approximating a point, means for dividing said collected light in accordance with the frequency of said light,
whereby a representation of the correlation integral of $f(x, y)$ and $g(x, y)$ and the convolution integral of $f(x, y)$ and $g^*(-x, -y)$ is obtained.

3. In an optical computing system
a two dimensional first object having a transparency which varies according to a particular function, said function having a first set of reference axes;
means including a polychromatic light source for generating on one face of said first object a continuum of physically shifted images of a second object, each of said images being generated by light of a different frequency, said images having a set of reference axes in the opposite direction to said first set; and
means for collecting the light passing through said first object into an area approximating a point;
means for dividing said collected light in accordance with the frequency of said light,
whereby a representation of the correlation integral of the function which defines said second object and said particular function is obtained.

4. In an optical computing system
a two dimensional first object having a transparency which varies according to a particular function, said function having a first set of reference axes;
means including a polychromatic light source for generating on one face of said first object a continuum of physically shifted images of a second object, each of said images being generated by light of a different frequency, said images having a set of reference axes opposite to said first set; and
means for collecting the light passing through said first object into an area approximating a point;
means for physically separating said collected light in accordance with the frequency of said light,
whereby a representation of the correlation integral of the function which defines said second object and said particular function and the convolution integral of the function which defines said second object and the function which is antisymmetric to said particular function is obtained.

5. A system for generating correlation integral of functions comprising:
a first two dimensional object having a transparency defined by a function $f(x, y)$, said function having a set of reference axes;
means for uniformly illuminating said first object with polychromatic light;
spectroscopic means for separating the light from each area of said first object into a continuum of images of said area, said images being physically separated in the $y$ dimension;
a second two dimensional object having a transparency defined by a function $g(x, y)$, said function $g(x, y)$ having a set of reference axes opposite in direction to said first set, said second object being positioned to receive said shifted images;
means for collecting the light passing through said second object into substantially one point; and
second spectroscopic means for deviating the light from said point by an amount dependent upon the frequency of the light;
whereby said second spectroscopic means generates an image which represents the correlation integral of said first and second functions.

6. An optical device for generating an image which represents the correlation integral of a first function and a second function and the convolution integral of said first function and the function which is antisymmetric to said second function, said functions having reference axes which are in opposite directions, comprising:
first and second objects, having transparencies respectively defined by said first and second functions;

means for uniformly illuminating said first object with polychromatic light;

first spectroscopic means for dividing the light from each area of said first object into a continuum of physically separated images and for projecting said images onto said second object;

means for collecting the light passing through said second object into an area approximating a point;

second spectroscopic means for dividing said collected light in accordance with the frequency of said light, whereby a representation is obtained of the correlation integral of said first and said second functions and the convolution integral of said first function and the function which is antisymmetric to said second function.

7. An optical device for generating an image which represents the auto-correlation integral of a function comprising:

an object having a transparency defined by said function, said function having a set of reference axes;

means for directing polychromatic light through said object;

spectroscopic means for dividing the light passing through said object into a continuum of physically separated images and for projecting said images back onto said object, said images being oriented in the same direction as said object when projected onto said object;

means for collecting the light passing back through said object into an area approximating a point;

means for dividing said collected light in accordance with the frequency of said light, whereby a representation is obtained of the auto-correlation integral of said function.

8. An optical device for generating an image which represents the auto-convolution integral of a function comprising:

an object having a transparency defined by said function, said function having a set of reference axes;

means for directing polychromatic light through said object;

spectroscopic means for dividing the light passing through said object into a continuum of physically separated images and for projecting said images back onto said object, said images being oriented one hundred and eighty degrees differently than said object when projected onto said object;

means for collecting the light passing back through said object into an area approximating a point;

means for dividing said collected light in accordance with the frequency of said light, whereby a representation is obtained of the auto-convolution integral of said function.

9. A system for generating the auto-correlation integral of a function comprising:

a two dimensional object having a transparency defined by a function $f(x, y)$, said function having a set of reference axes $x$ and $y$;

means for uniformly illuminating said object with polychromatic light;

spectroscopic means for separating the light from each area of said object into a continuum of images of said area, said images being physically separated in the $y$ dimension, said spectroscopic means including means for projecting said images back onto said object, said images being oriented in the same direction as said object when projected onto said object;

means for collecting the light passing back through said object into substantially one point; and second spectroscopic means for deviating the light from said point by an amount dependent upon the frequency of the light, whereby said second spectroscopic means generates an image which represents the auto-correlation integral of said function.

10. A system for generating the auto-convolution integral of a function comprising:

a two dimensional object having a transparency defined by a function $f(x, y)$, said function having a set of reference axes $x$ and $y$;

means for uniformly illuminating said object with polychromatic light;

spectroscopic means for separating the light from each area of said object into a continuum of images of said area, said images being physically separated in the $y$ dimension, said spectroscopic means including means for projecting said images back onto said object, said images being oriented one hundred and eighty degrees differently than said object when projected onto said object;

means for collecting the light passing back through said second object into substantially one point; and second spectroscopic means for deviating the light from said point by an amount dependent upon the frequency of the light, whereby said second spectroscopic means generates an image which represents the auto-convolution integral of said function.

11. A system for generating correlation integrals of functions comprising:

a first two dimensional object having a transparency defined by the function $f(x, y)$, said function having a first set of reference axes $x$ and $y$;

means for directing collimated polychromatic light through said object;

spectroscopic means for separating the light passing through each area of said object into a continuum of images of said area, said images being physically separated in the $y$ dimension;

a second two dimensional object having a transparency defined by the function $g(x, y)$, where the reference axes for the second function are opposite to said first set, said second object being positioned to receive said shifted images;

means for collecting the light passing through said second object into substantially one point;

means for separating the light passing said point into a one dimensional array; and second spectroscopic means for deviating the light from said one dimensional array by an amount dependent upon the frequency of the light;

whereby said second spectroscopic means generates an image which represents the correlation integral of said functions $f(x, y)$ and $g(x, y)$.

References Cited

UNITED STATES PATENTS

| | | | |
|---|---|---|---|
| 3,191,487 | 6/1965 | Kruythoff et al. | 350—168 |
| 3,227,034 | 1/1966 | Shelton | 88—1 |
| 3,246,557 | 4/1966 | Mertz et al. | 350—168 |
| 3,030,021 | 4/1962 | Ferre. | |
| 3,211,048 | 10/1965 | Girard. | |

DAVID SCHONBERG, *Primary Examiner.*

JOHN K. CORBIN, DAVID H. RUBIN, *Examiners.*

R. J. STERN, *Assistant Examiner.*